(12) United States Patent
Chen et al.

(10) Patent No.: US 7,542,269 B2
(45) Date of Patent: Jun. 2, 2009

(54) COMPUTER ENCLOSURE WITH ROTATABLE POWER SUPPLY

(75) Inventors: Yun-Lung Chen, Tu-Cheng (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 188 days.

(21) Appl. No.: 11/608,807

(22) Filed: Dec. 9, 2006

(65) Prior Publication Data

US 2008/0137280 A1 Jun. 12, 2008

(51) Int. Cl.
*H05K 5/00* (2006.01)
(52) U.S. Cl. .................... 361/679.02; 361/725
(58) Field of Classification Search ................ 361/683, 361/685, 724, 725, 726, 727
See application file for complete search history.

(56) References Cited

U.S. PATENT DOCUMENTS

| 5,169,221 | A | * | 12/1992 | Wheeler ..................... 312/323 |
| 5,584,396 | A | * | 12/1996 | Schmitt ....................... 361/727 |
| 5,745,342 | A | * | 4/1998 | Jeffries et al. ................ 361/725 |
| 5,777,848 | A | * | 7/1998 | McAnally et al. ........... 361/725 |
| 5,784,251 | A | * | 7/1998 | Miller et al. ................. 361/725 |
| 6,215,664 | B1 | * | 4/2001 | Hernandez et al. .......... 361/725 |
| 6,781,841 | B2 | * | 8/2004 | Kim et al. .................... 361/724 |
| 6,813,156 | B2 | * | 11/2004 | Park ........................... 361/725 |
| 7,254,018 | B2 | * | 8/2007 | Zhang et al. ................. 361/685 |
| 7,257,827 | B2 | * | 8/2007 | Lee ............................. 720/653 |
| 2003/0193782 | A1 | * | 10/2003 | Chen .......................... 361/726 |
| 2005/0185373 | A1 | * | 8/2005 | Chen et al. .................. 361/685 |

* cited by examiner

*Primary Examiner*—Jayprakash N Gandhi
*Assistant Examiner*—Adrian S Wilson
(74) *Attorney, Agent, or Firm*—Wei Te Chung

(57) ABSTRACT

A computer enclosure includes a chassis (10), a disk drive bracket (20) secured in the chassis, and a power supply box (30) pivotally attached to the disk drive bracket. The disk drive bracket includes a pair of sidewalls (24) oppositely. A limiting guide slot (241) and a pivot guide slot (243) are defined in each of the sidewalls. The power supply box includes a pivot post (33) and a sliding post (31) formed on each side thereof. Each of the sliding guide slot and pivot guide slot includes an entrance portion for slidably receiving the sliding post and the pivot post into the sliding guide slot and the pivot guide slot respectively. The sliding guide slot includes an arc-shaped sliding portion to allow the sliding post sliding therealong such that the box is pivotable with respect to the bracket about the pivot post.

15 Claims, 5 Drawing Sheets

COMPUTER ENCLOSURE WITH ROTATABLE POWER SUPPLY

BACKGROUND

1. Technical Field

The present invention relates to computer enclosures, and more particularly to a computer enclosure with a rotatable power supply box.

2. General Background

Smaller computer designs require more efficient use of space within the chassis. Components are placed closer together, making it difficult to get to adjacent components for repair. Many personal computers include power supplies for converting alternating current to direct current, which is used to operate the personal computers' components. Some power supplies for personal computers are mounted directly to the chassis using screws. The associated inconveniences of this type of mounting technique might discourage designers from effectively using interior space.

A better method of mounting a power supply within a PC chassis enables the power supply to be rotated partly out of the chassis to provide access to adjacent components. U.S. Pat. No. 6,215,664 discloses a method and apparatus for mounting a power supply within a PC chassis such that it is ratchetably rotatable. The chassis includes a pivot receptacle, a hook, and a dimple. The power supply is received by a mounting bracket which includes a corresponding pivot point, a curved slot having a relatively wide portion disposed at one end for engaging the hook of the chassis and a relatively narrow portion for retaining the hook during rotation of the power supply, and a plurality of shorter slots oriented in a curve for engaging the dimple of the chassis thereby providing the ratcheting action and preventing the rotation of the power supply until force is applied. In an alternative embodiment, the power supply is mounted to be translatable and rotatable. The chassis includes two cams, and a hook. The power supply is received by a mounting bracket which includes two cam slots each having a straight portion and a curved portion for engaging the cams of the chassis, and a straight slot having a relatively narrow portion that engages the hook of the chassis and a relatively wide portion that allows the hook to disengage from the slot. The hook and slot prevent rotation, ensuring the translational movement as the cams reach the curved portion of its slot and disengages, thus allowing rotation. A lip disposed on the power supply supports the weight of the power supply, as well as helping guide the power supply during the translational motion.

However, the computer enclosure with a rotatable power supply has a complicated structure and it is complicated to manufacture.

What is needed, therefore, is a computer enclosure with a rotatable power supply and having a simple structure.

SUMMARY

A computer enclosure includes a chassis, a disk drive bracket secured in the chassis, and a power supply box pivotally attached to the disk drive bracket. The disk drive bracket includes a bottom wall and a pair of sidewalls connecting with two sides of the bottom wall respectively. A limiting guide slot and a pivot guide slot are defined in each of the sidewalls. The power supply box includes a pivot post and a sliding post formed on each side thereof. Each of the sliding guide slot and pivot guide slot includes an entrance portion for slidably receiving the sliding post and the pivot post into the sliding guide slot and the pivot guide slot respectively. The sliding guide slot includes an arc-shaped sliding portion to allow the sliding post sliding therealong such that the box is pivotable with respect to the bracket about the pivot post between a first position where the box is located within the chassis and supported on the bracket and a second position where the box is pivoted to outside of the chassis via the opening.

Other advantages and novel features will be drawn from the following detailed description of preferred embodiments with attached drawings, in which:

DETAILED DESCRIPTION OF PREFERRED EMBODIMENTS

Figure 1:
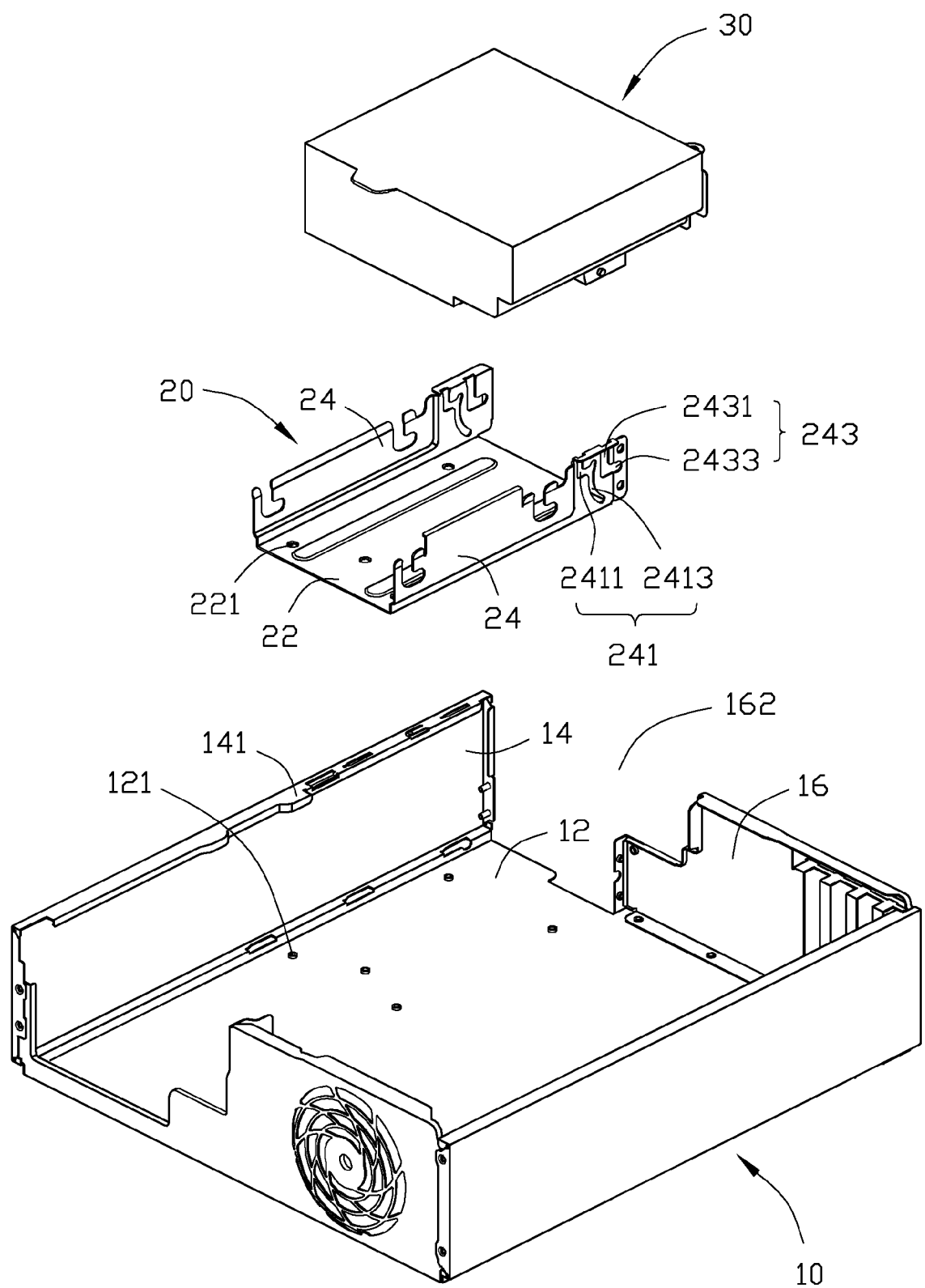
FIG. 1 is an exploded, isometric view of a computer enclosure in accordance with a preferred embodiment of the present invention, the computer enclosure including a chassis, a disk drive bracket, and a power supply box.

Referring to FIG. 1, a computer enclosure in accordance with a preferred embodiment of the present invention includes a chassis 10, a disk drive bracket 20 for hard disk drives, and a power supply box 30 for receiving a power supply therein.

The chassis 10 includes a bottom panel 12 and a side panel 14 connected with a left edge of the bottom panel 12, and another side panel 16 perpendicularly connected with the bottom panel 12 and the side panel 14. A plurality of securing posts 121 each with a hole defined therein protrude up from the bottom panel 12. A resisting piece 141 is formed on a top edge of the side panel 14. The side panel 16 defines an opening 162 adjacent to the side panel 14 and the bottom panel 12.

The disk drive bracket 20 includes a bottom wall 22 and a pair of sidewalls 24 connecting with two opposite sides of the bottom panel 22 respectively. A plurality of securing holes 221 corresponding to the securing posts 121 respectively are defined in the bottom wall 22 of the disk drive bracket 20. A limiting guide slot 241 and an "L" shaped pivot guide slot 243 are defined in a front portion of each of the sidewalls 24. The limiting guide slot 241 includes an L-shaped entrance portion 2411 defined in a top of the sidewall 24 and a lengthways arc-shaped sliding portion 2413 connecting with an end of the entrance portion 2411. An upper portion of the arc-shaped sliding portion 2413 is higher than the end of the entrance portion 2411, and a lower portion of the arc-shaped sliding portion 2413 is lower than the entrance portion 2411. The L-shaped pivot guide slot 243 includes an entrance portion 2431 and a pivot portion 2433 connected with the end of the entrance portion 2431.

Figure 2:
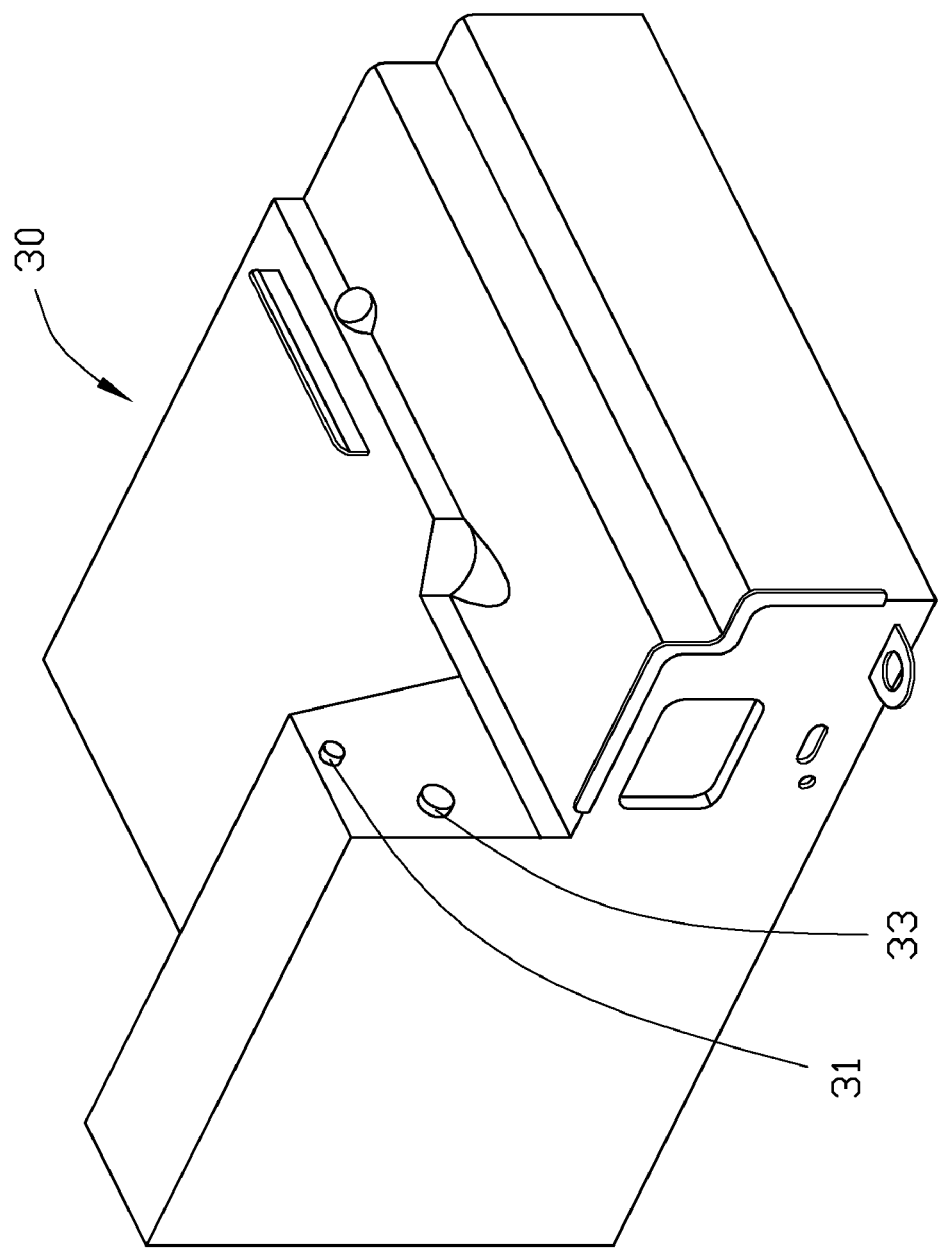
FIG. 2 is an enlarged view of the power supply box of FIG. 1, viewed from another aspect.

Referring to FIG. 1 and FIG. 2, the power supply box 30 is ladder-shaped. A limiting post 31 corresponding to the limiting guide slot 241 and a pivoting post 33 corresponding to the pivot guide slot 243 are formed on each side of the power supply box 30. A distance from an entrance of the limiting guide slot 241 to an entrance of the pivot guide slot 243 in a same side is equal to a distance between the limiting post 31 and the pivot post 33 in a same side. A radius of the arc-shaped sliding portion 2413 is equal to the distance between the limiting post 31 and the pivot post 33 in a same side.

Figure 3:
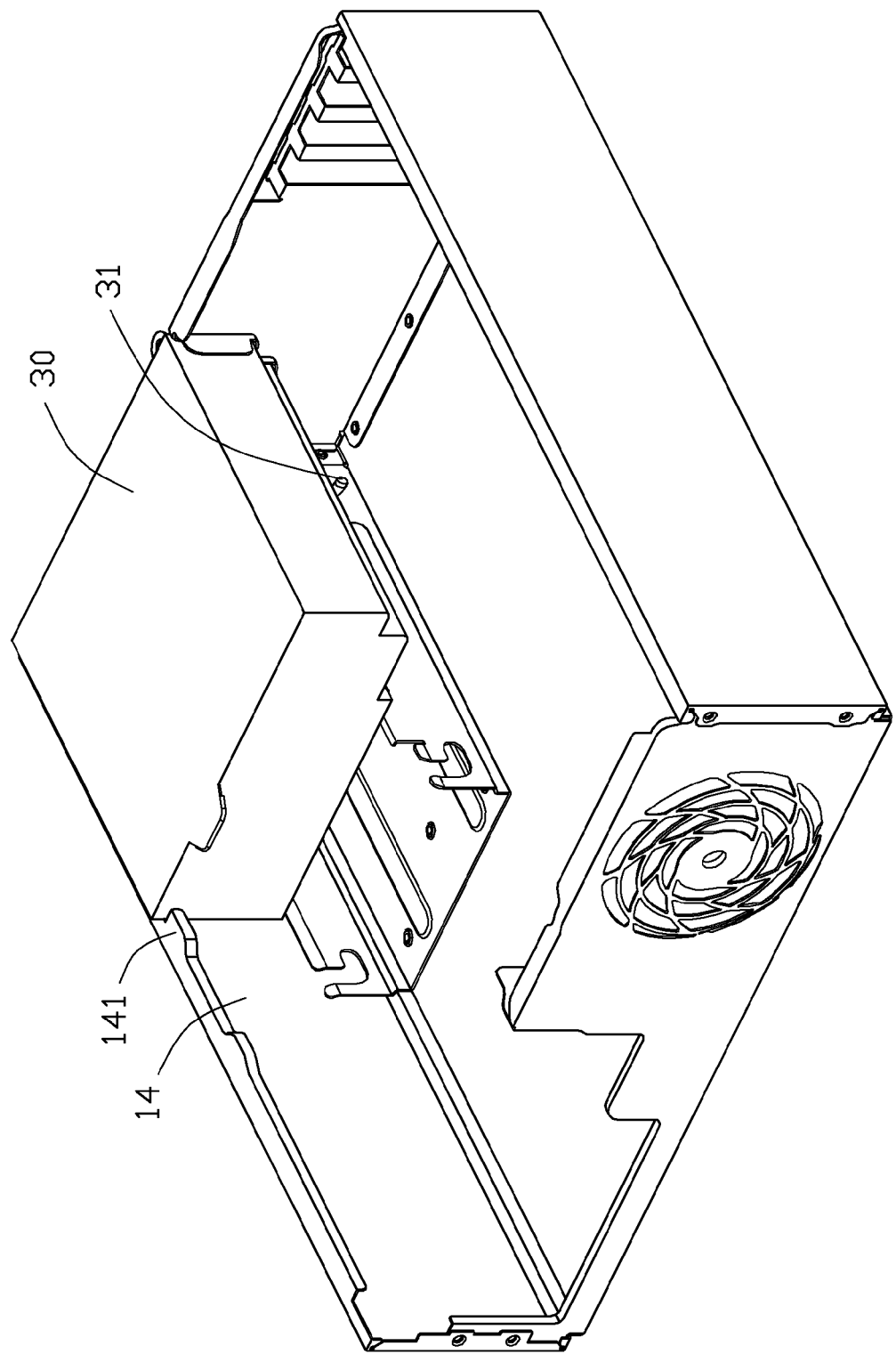
FIG. 3 is an assembled view of FIG. 1.

Referring to FIG. 3, in assembly of the power supply box 30, the securing posts 121 of the chassis 10 extend through the securing holes 221 of the disk drive bracket 20, the disk drive bracket 20 is secured in the chassis 10, one of the sidewalls 24 of the disk drive bracket 20 resists against the side panel 14 of the chassis 10. The limiting posts 31 and the pivot posts 33 extend through the corresponding limiting guide slots 241 and pivot guide slots 243 respectively. The limiting posts 31 slide along the limiting guide slots 241 from the L-shaped entrance portion 2411 until sliding into a bottom end of the arc-shaped sliding portion 2413. The pivot posts 33 slide along the L-shaped pivot guide slots 243 from the entrance portions 2431 until the pivot posts 33 slide into two ends of the pivot portion 2433 of the pivot guide slots 243 respectively. Thus the power supply box 30 is in position and pivotally attached to the disk drive bracket 20. The resisting piece 141 of the chassis resists against an end of the power supply box 30 opposing to the side panel 16.

Figure 4:
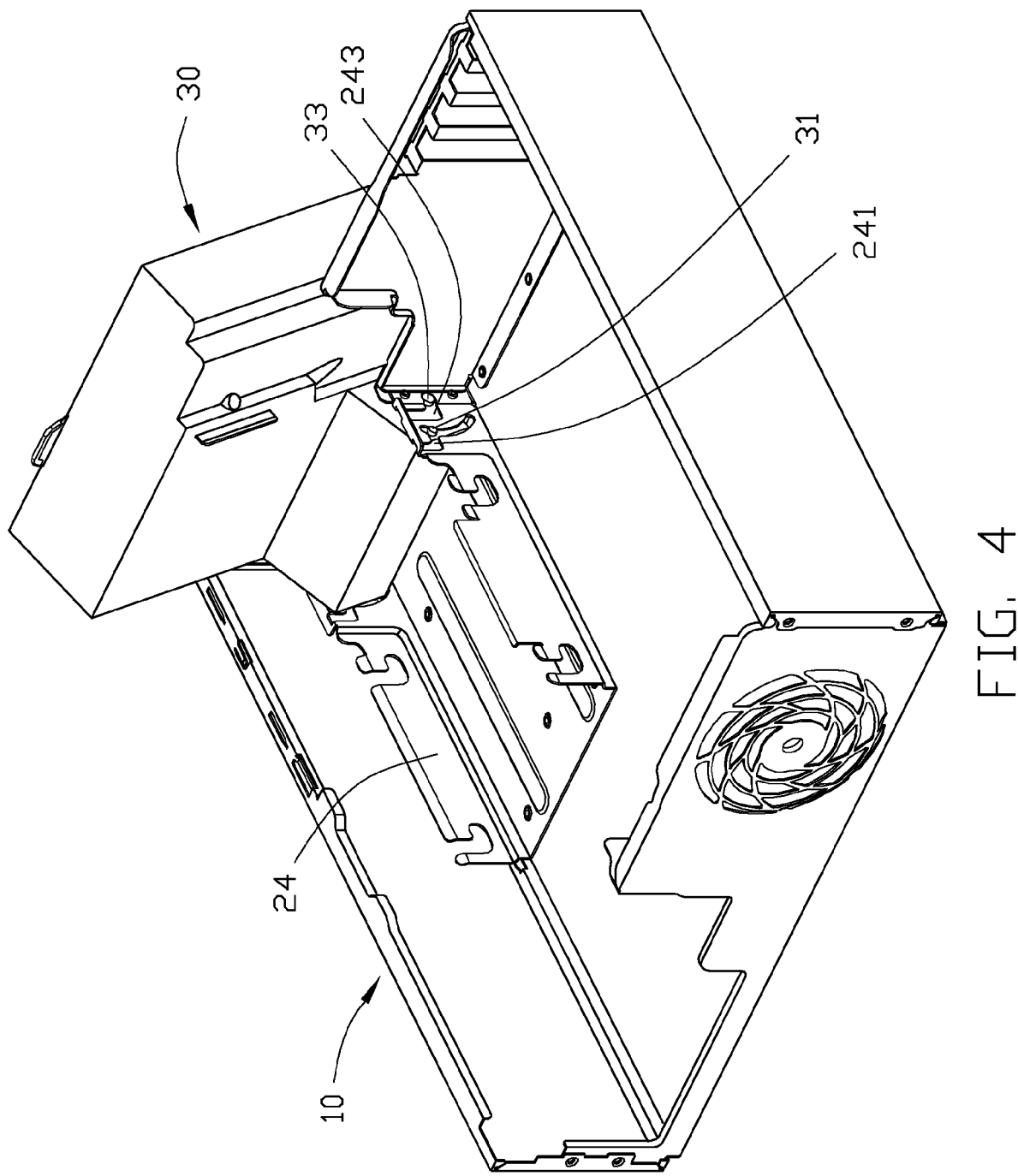
FIG. 4 shows the power supply of FIG. 3 rotated to a position wherein the power supply can slide out.

Referring to FIG. 4, in disassembly of the power supply box 30, rotating the power supply box 30 counter-clockwise and upward, the power supply box 30 pivots about the pivot posts 33 formed on two sides thereof. The limiting posts 31 slide upward along the arc-shaped sliding portion 2413 of the limiting guide slots 241 of the disk drive bracket 20. When the limiting posts 31 each reach a junction of the entrance portion 2411 and the arc-shaped sliding portion 2413 of the limiting guide slot 241 as shown in FIG. 4, the power supply box 30 is moved rearward until the limiting posts 31 slide into the entrance portions 2411 of the limiting guide slots 241, and the pivot posts 33 slide into the entrance portions 2413 of the pivot guide slots 243. Then the power supply box 30 can be moved out from the limiting slots 241 and the pivot guide slot 243.

Figure 5:
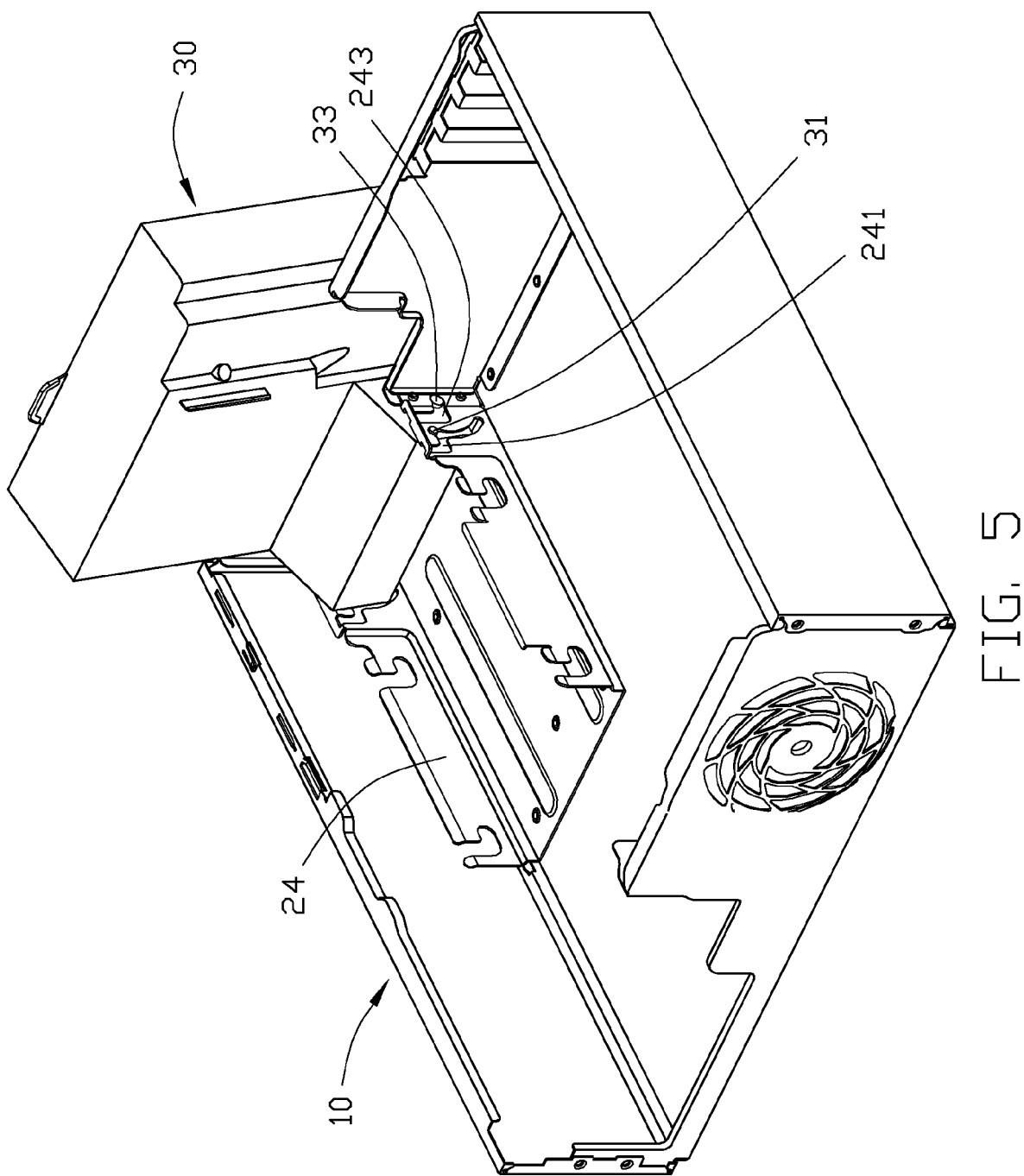
FIG. 5 shows the power supply of FIG. 4 rotated to its maximal degree of rotation.

Referring to FIG. 5, when the limiting posts 31 each reach a junction of the entrance portion 2411 and the arc-shaped sliding portion 2413 of the limiting guide slot 241 as shown in FIG. 4, the power supply box 30 is rotated further until the power supply box 30 is rotated to its limit of rotation where the posts 31 reach to the topmost ends of the sliding portions 2413 and a majority of the power supply box 30 is rotated to outside of the bracket 20 via the opening 162, the power supply box 30 can be retained in this position, and users can repair or change disk drives in the disk drive bracket 20 conveniently.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a chassis;
    a disk drive bracket mounted in the chassis, comprising a bottom wall and a pair of sidewalls connecting with two sides of the bottom wall, a limiting guide slot and a pivot guide slot being defined in each of the sidewalls; and
    a power supply box pivotally attached to the disk drive bracket, comprising a pivot post formed on each of two sides thereof engaging in the pivot guide slot, and a limiting post formed on each of the two sides thereof engaging in the limiting guide slot, the limiting post sliding along the limiting guide slot when the power supply is rotated relative to the disk drive bracket about the pivot posts between a first position where the box is located within the chassis and supported on the bracket and a second position where the box is pivoted to outside of the chassis;
    wherein the limiting guide slot comprises an L-shaped entrance portion and an arc-shaped sliding portion connecting with an end of the L-shaped entrance portion;
    wherein an upper portion of the arc-shaped sliding portion of the limiting guide slot is higher than the end of the L-shaped entrance portion, a lower portion of the arc-shaped sliding portion is lower than the end of the L-shaped entrance portion of the limiting guide slot.

2. The computer enclosure as described in claim 1, wherein the pivot guide slot comprises an entrance portion and a pivot portion perpendicularly connecting with the entrance portion of the pivot guide slot.

3. The computer enclosure as described in claim 2, wherein the pivot post of the power supply box extends through an end of the corresponding pivot portion of the pivot guide slot.

4. The computer enclosure as described in claim 3, wherein a radius of the arc-shaped sliding portion of the limiting guide slot is equal to a distance between the limiting post and the pivot post in a same side, a vertex of an angle subtended by the arc-shaped sliding portion is the end of the pivot portion of the pivot guide slot.

5. The computer enclosure as described in claim 4, wherein a distance from an entrance of the limiting slot to an entrance of the pivot portion in a same side is equal to a distance between the limiting post and the pivot post in a same side in a direction parallel to the bottom wall.

6. A computer enclosure comprising:
    a chassis;
    a disk drive bracket secured in the chassis, comprising a bottom wall and a pair of sidewalls connecting with two sides of the bottom wall, a pair of symmetrical limiting guide slots and a pair of symmetrical pivot guide slots defined in the sidewalls, each limiting guide slot comprising an arc-shaped sliding portion and an entrance portion connecting with the arc-shaped sliding portion; and
    a power supply box pivotally attached to the disk drive bracket, comprising a pair of pivot posts engaging in two ends of the pivot guide slots respectively, and a pair of limiting posts extending through the arc-shaped sliding portions of the limiting guide slots respectively;
    wherein the pivot posts and the limiting posts are capable of sliding along the same directions until the pivot posts engage in two ends of the pivot guide slots and the limiting posts reaches joints of the entrance portion and the arc-shaped sliding portion.

7. The computer enclosure as described in claim 6, wherein a distance from an entrance of the limiting guide slot to an entrance of the pivot guide slot in a same side is equal to a distance between the limiting post and the pivot post in a same side.

8. The computer enclosure as described in claim 7, wherein a radius of the arc-shaped sliding portion of the limiting guide slots is equal to the distance from the limiting post to the pivot post in a same side.

9. The computer enclosure as described in claim 8, wherein the limiting posts slide along the corresponding arc-shaped sliding portions of the limiting guide slots when the power supply is rotating about the pivot post.

10. The computer enclosure as described in claim 6, wherein the pivot guide slots are L-shaped, the pivot posts respectively engage in an end of the corresponding L-shaped pivot guide slot.

11. A computer enclosure comprising:

a chassis comprising a bottom panel and a pair of side panels perpendicular to each other, one of the side panels defining an opening;

a box configured for receiving an electronic component therein, the box comprising at least one pivot post and at least one sliding post; and a bracket secured in the chassis comprising a pair of sidewalls configured to hold a storage device therebetween, the bracket defining at least one sliding guide slot and at least one pivot guide slot in the sidewalls, each of the at least one sliding guide slot and the at least one pivot guide slot comprising an entrance portion reaching a top of the corresponding sidewall of the bracket for slidably receiving the at least one pivot post and the at least one sliding post into the at least one sliding guide slot and the at least one pivot guide slot respectively, the at least one sliding guide slot comprising an arc-shaped sliding portion connecting with an end of the entrance thereof to allow the at least one sliding post sliding therealong such that the box is pivotable with respect to the bracket about the pivot post between a first position where the box is located within the chassis and supported on the bracket and a second position where the box is pivoted to outside of the chassis via the opening;

wherein the at least one pivot post and the at least one sliding post are capable of sliding along the same directions until the at least pivot post reaches an end of the at least one pivot guide slot and the at least one sliding post reaches a joint of the entrance portion and the arc-shaped sliding portion of the at least one sliding guide slot.

12. The computer enclosure as claimed in claim 11, wherein the arc-shaped sliding portion comprises two end portions respectively receiving the at least one sliding post at the first and second positions, the entrance portion of the at least one sliding guide slot joining to one portion of the arc-shaped sliding portion spaced from the two end portions.

13. The computer enclosure as claimed in claim 12, wherein the entrance portions are L-shaped such that the box is slidable with respect to the bracket in two different directions via the at least one pivot post and the at least one sliding post sliding in the at least one sliding guide slot and the at least one pivot guide slot respectively.

14. The computer enclosure as claimed in claim 11, wherein the other one of the side panels forms a resisting portion resisting against a side of the box opposing the one of the side panels when the box is located at the first position.

15. The computer enclosure as claimed in claim 11, wherein the box is a power supply box configured to receive a power supply therein.

* * * * *